United States Patent [19]

Flay

[11] 3,852,258

[45] Dec. 3, 1974

[54] PROCESS FOR PREPARING POLYOLEFIN SUBSTITUTED AMINES

[75] Inventor: Roy B. Flay, Concord, Calif.

[73] Assignee: Chevron Research Company, San Francisco, Calif.

[22] Filed: Dec. 18, 1972

[21] Appl. No.: 316,331

[52] U.S. Cl......... 260/93.7, 260/94.8, 260/94.9 GB, 260/94.9 H, 260/583, 260/585 A
[51] Int. Cl.......................... C08f 27/08, C08f 27/02
[58] Field of Search...... 260/94.9 GB, 94.9 H, 94.8, 260/93.7, 585 A, 583

[56] References Cited
UNITED STATES PATENTS

| | | | |
|---|---|---|---|
| 3,410,906 | 12/1968 | Simpson et al. | 260/585 A |
| 3,438,757 | 4/1969 | Honnen et al. | 260/583 |
| 3,657,347 | 4/1972 | Muller et al. | 260/585 A |
| 3,671,511 | 6/1972 | Honnen et al. | 260/94.9 GB |
| 3,739,029 | 6/1973 | Magoon et al. | 260/585 A |
| 3,764,626 | 10/1973 | Pivette | 260/585 A |

*Primary Examiner*—Joseph L. Schofer
*Assistant Examiner*—A. Holler
*Attorney, Agent, or Firm*—G. F. Magdeburger; C. J. Tonkin; M. D. Nelson

[57] ABSTRACT

An improved process for treating a mixture containing a volatile primary or secondary amine having a boiling point below about 200°C at atmospheric pressure, HCl, and a hydrocarbylamine to quantitatively remove said volatile amine from the mixture, by contacting said mixture with a less volatile fluid amine having a boiling point at least about 5°C–40°C greater than the boiling point of said volatile amine, and volatilizing (stripping) said volatile amine from the mixture.

5 Claims, No Drawings

PROCESS FOR PREPARING POLYOLEFIN SUBSTITUTED AMINES

BACKGROUND OF THE INVENTION

1. Field of the Invention

Hydrocarbyl amines have been discovered to be useful fuel and lubricant additives, U.S. Pat. No. 3,438,757. These hydrocarbyl amines can be prepared by chlorinating a polyolefin followed by the reaction of the chlorinated polyolefin with a primary or secondary amine. The process, as generally practiced, produces waste products containing excess unreacted amine. A process for more completely or even quantitatively separating the unreacted amine from the product is needed so that waste can be avoided and the amine recovered for recycling.

Hydrocarbylamine fuel additives are normally prepared by reacting primary or secondary amines with a halogen-containing hydrocarbon having at least 30 carbon atoms per molecule, e.g., $C_{30}$-alkenyl chloride. In general, the alkenyl chloride is obtained by the chlorination of a polyolefin having at least 30 carbon atoms. The chlorination is advantageously carried out with a quantity of chlorine which is just sufficient to convert the alkene into the corresponding alkenyl chloride. The reaction between the alkenyl chloride and the primary or secondary amine is carried out at a temperature between −40°C. and 105°C, preferably in the presence of an inert solvent. A preferred alkenyl chloride is polyisobutenyl chloride. In the reaction between alkenyl chloride and amine, in addition to the desired hydrocarbylamine fuel additive, HCl is formed, which HCl combines with the amine used as starting material to form the amine hydrochloride. Therefore, unless special procedures are used, the primary or secondary amine reactant must be present in great excess. Since it is desirable to keep the quantity of amine required for the preparation of the fuel additives as small as possible, it is preferred in the prior art to carry out the reaction in the presence of an HCl acceptor which is different from both the amine used as a starting material and the additive product. Hydrogen halide acceptors which have been used in the preparation of hydrocarbylamines include, for example, hydroxides, bicarbonates, and carbonates, such as sodium carbonate or potassium carbonate.

2. Description of the Prior Art

The basic process in the field is described by Honnen, Andrewsen and Lindstrom in U.S. Pat. No. 3,671,511. It is also known to separate amines from an aqueous mixture by making the mixture alkaline by the addition of caustic, e.g., U.S. Pat. Nos. 3,394,186 and 3,454,645. The present invention is a novel improvement to these processes which permits batch-wise or continuous large-scale production of hydrocarbylamines with effective recovery of excess amine reactant.

SUMMARY OF THE INVENTION

An improvement to the process for the preparation of hydrocarbylamine by treating a mixture comprising a volatile primary or secondary amine having a boiling point below about 200°C at atmospheric pressure, HCl and the hydrocarbylamine to more completely or quantitatively remove said volatile amine from the mixture. In the improved process the mixture is contacted with a less volatile fluid amine having a boiling point at least about 5°C. greater than the boiling point of said volatile amine and preferably about 40°C. greater, prior to stripping the mixture. The process is preferably carried out by contacting less volatile fluid amine with the mixture at a temperature below 200°C and then stripping the more volatile amine from the mixture. The less volatile fluid amine is an alkyl, alkylene or aryl amine, or a mixture or combination of these, e.g., alkaryl amine. The less volatile fluid amine may be a mixture of higher boiling amines in a suitable solvent. The hydrocarbylamine of the product mixture contains a hydrocarbyl group of at least 30 carbon atoms.

DETAILED DESCRIPTION OF THE INVENTION

The improved process of this invention provides a method for more completely or quantitatively removing a relatively volatile primary or secondary amine, having a boiling point below about 200°C at atmospheric pressure, from a mixture comprising a hydrocarbylamine, wherein said hydrocarbyl group contains at least 30 carbon atoms, and HCl in addition to said volatile amine. The volatile amine is normally present as excess reactant from the amination of alkenyl chlorides which yields the hydrocarbylamine product. The volatile amine is at least partially present in the form of the amine hydrochloride. The amination process is described in Honnen, Andrewsen and Lindstrom, U.S. Pat. No. 3,671,511, which disclosure is incorporated herein by reference.

The Honnen, Andrewsen and Lindstrom process for the preparation of hydrocarbylamine comprises contacting a polyolefin and chlorine in a mole ratio of from 0.5 to 5 moles of chlorine per mole of polyolefin in an inert medium at a temperature of from about −40° to 105°C (−40° to 120°F) at a pressure ranging from about atmospheric to about 75 psig to form a chlorinated polyolefin and hydrogen chloride, stripping the inert medium and hydrogen chloride from the system in a multistage stripping section, contacting a primary or secondary amine with the chlorinated polyolefin at a ratio of from 1 to 6 moles of amine per gram-atom of chlorine in the chlorinated polyolefin at a temperature of from about 75 to 200°C (150° to 390°F) under a pressure in the range of from about atmospheric to the vapor pressure of the system to form a polyolefin-substituted amine (hydrocarbylamine) and amine hydrochloride charging a diluent, an alkanol, and wash water to the system in amounts of from about 1 to about 4 volumes of the diluent per 1 volume of hydrocarbylamine and not less than 0.1 volume of alkanol per volume of hydrocarbylamine, washing the system to separate the amine hydrochloride and excess unreacted amines from the hydrocarbylamine at a temperature not exceeding about 105°C (220°F) maximum, and stripping alkanol, water and a portion of diluent from the hydrocarbylamine.

Alternatively, in the Honnen et al. process, excess unreacted amine is removed from the product mixture prior to charging diluent, alkanol and wash water by stripping the product mixture (volatilizing the amine from the mixture) at elevated temperatures and reduced pressures. In this process the amine is only incompletely removed. In another preferred alternative, a caustic solution is introduced into the washing operation in an amount sufficient to neutralize the amine hydrochloride.

The improved process of the present invention provides a method for more complete or even quantitative removal of the unreacted primary or secondary amine by utilizing an amine salt exchange reaction with a less volatile fluid amine prior to stripping the product mixture. Consequently, in the present invention the primary or secondary amine used to react with alkenyl chloride prepared from polyolefin and chlorine to form the hydrocarbylamine product is referred to as the "volatile amine." "Hydrocarbyl," as used herein, denotes an organic radical composed of carbon and hydrogen derived from a polyolefin.

The process improvement of the present invention is based on an "amine salt exchange" reaction. The amine salt exchange is believed to be exemplified by the following equilibrium reaction:

$$RNH_2 \cdot HCl + R'NH_2 \rightleftarrows RNH_2 + R'NH_2 \cdot HCl$$

wherein $RNH_2$ represents a volatile amine boiling below about 200°C at atmospheric pressure and $R'NH_2$ represents a less volatile amine having a boiling point at least about 5°C greater and preferably about 40°C greater than the boiling point of said volatile amine. For purposes of illustration, R represents an alkyl group and R' represents an aliphatic, alicyclic or aromatic group, or combination of these. Although two primary monoamines have been chosen for purposes of illustration, the amine salt exchange is not limited to monoamines or primary amines, but is a general equilibrium relation applicable to amines, polyamines, primary, secondary and tertiary amines. The equilibrium is believed to be extendable to the right, thus liberating more volatile amine from the salt, by the addition of excess of the less volatile amine or by removal of the volatile free amine, as by stripping the mixture.

The preferred process conditions set forth are optimal conditions in that the desired extractions could be obtained by operation outside these ranges albeit not as efficiently.

The amine salt exchange reaction is carried out by contacting the mixture of volatile amine, HCl and hydrocarbylamine with the less volatile fluid amine under conditions of temperature and pressure such that the fluidity of the mixture is assured, and normally, below about 200°C and at pressures ranging from about atmospheric pressure to the vapor pressure of the liquid mixture. The amount of less volatile amine added depends on the concentration of excess volatile amine as the amine salt. Normally, about an equivalent amount of the less volatile amine is added, although an excess of about 10 percent or more can be used. Stripping the more volatile amine from the mixture is believed to push the amine salt exchange equilibrium towards freeing the more volatile amine.

The volatilization and removal of the volatile amine from the mixture is carried out as described in Honnen, Andrewson and Lindstrom U.S. Pat. No. 3,671,511, which disclosure is hereby incorporated by reference. The present process improves upon the latter process in permitting more complete removal of the volatile amine in the stripping section because the amine exchange reaction serves to liberate the volatile amine from the non-volatizable amine salt.

In a preferred embodiment of the invention, the less volatile fluid amine having a boiling point at least about 10°C above that of the volatile amine at the same pressure, and preferably at least about 5°–40°C greater, is added to the mixture of hydrocarbylamine, HCl and excess volatile amine by mixing in a tank or vat before the mixture is fed to the stripping section. The liberated volatile amine can be quantitatively stripped from the mixture by the stripping process described in U.S. Pat. No. 3,671,511. The volatile amine can be subsequently recycled in the amination process.

In one embodiment the residue after stripping of the volatile amine is made caustic and the separation and purification of hydrocarbylamine proceeds as described in U.S. Pat. No. 3,671,511. This process does not lead to recovery of the less volatile amine.

In another embodiment, the less volatile amine and its hydrochloride are soluble in aqueous HCl so that the less volatile amine and its hydrochloride are extracted from the crude product with dilute acid. The aqueous phase carries off the less volatile amine as the hydrochloride. This phase separation under acid conditions yields a crude hydrocarbylamine product which is then subjected to a purification process, U.S. Pat. No. 3,671,511. The aqueous phase is treated with caustic to yield a water insoluble less volatile amine and NaCl. The less volatile amine can be recycled. In order to efficiently carry out this separation and recovery of the less volatile amine by acid treatment, it is preferred that the less volatile amine have a very low solubility in water and be soluble in aqueous HCl.

Polyolefin reactants in the amination process which yields the hydrocarbylamine product found in the present mixture have been described in U.S. Pat. Nos. 3,671,511 and 3,438,757. However, the primary or secondary amine reactants in the amination process which find use within the scope of the present invention are limited to volatile primary or secondary amines having boiling points below about 200°C. It is these volatile amines, which are added in excess in the amination process, which are removed by the amine salt exchange and volatilization (stripping) steps of the present invention. Such amines include, but are not limited to, methylamine (−6.3°C), dimethylamine (6.9°C), ethylamine (16.6°C), n-propylamine (47.8°C), tripropylamine (151°C), n-butylamine (77.8°C), tributylamine (199°C), cyclohexylamine (134.5°C), diethylene triamine (207°C), ethylene diamine (116°–117°C), and dimethylamino propylamine (130°–137°C). Normal boiling points have been given in parentheses.

The "less volatile" fluid amines which are added to the product mixture in the present invention have boiling points which are at least about 5°C, and preferably at least about 5°–40°C above that of the corresponding volatile amine at the same pressure. Consequently, some of the higher boiling amines exemplified above, such as tripropylamine, can serve as "less volatile amines" relative to lower boiling amines such as n-butylamine. However, amines having boiling points above about 200°C are preferred for service as "less volatile amines" in many embodiments of the present invention. Such amines are illustrated by, but not limited to, the following: triethylene tetramine (266°C), tetraethylene pentamine (333°C), p-tert.-butylaniline (241°C), N,N-dibutylaniline (263°C), N,N-diethylaniline (215.5°C), triisopropanolamine (306°C), decylamine (220°C), N,N-dimethylaniline (193°C), and diethanol amine.

Other less volatile amines include fatty amines, such as dioctylamine and trioctylamine. Solid amines, or viscous amines, may be fluidized for workability in the present invention either by use at higher temperature, or preferably, by dilution with lighter less volatile amines or inert solvents such as benzene or xylene. Viscous mixed amine residues from the production of polyalkylene polyamines can be so diluted and used in the present process.

EXAMPLE 1

200 grams of a polybutene ethylene diamine product mixture containing unreacted ethylene diamine and ethyl diamine · HCl salt is distilled at a pot temperature of 220°C at 1 atmosphere pressure. 7.5 ml. (7 grams) of a cut which distilled at an overhead temperature of 111°–113°C was recovered. This represents 3.5 percent of the ethylene diamine in the mixture. The recovered overhead contained 38.5 percent nitrogen by weight.

EXAMPLE 2

To another 100 grams of the polybutene ethylene diamine product mixture of Example 1 is added 100 grams of dimethylaniline. The mixture is distilled to a pot temperature of 197°C and 7 grams of overhead is recovered at an overhead temperature of 117.5°–119°C. This represents 7 percent of the ethylene diamine in the mixture.

In a separate experiment 200 grams of the dimethylaniline did not produce any overhead to a pot temperature of 192°C. Thus the 3.5 percent by weight of extra ethylene diamine which is recovered from Example 2 is due to the amine exchange reaction.

The solubility of dimethylaniline in water is 1.4 g/100 ml. The hydrochloride of dimethylaniline is completely soluble. A test showed that dimethylaniline dissolves in aqueous HCl and that it can be recovered by addition of caustic.

EXAMPLE 3

The crude product mixture of polyisobutylene ethylene diamine is mixed with solvent to reduce viscosity. Dilute aqueous HCl is added to extract dimethylaniline as, the hydrochloride. A 50% excess of HCl is used to assure complete extraction. The aqueous phase from the extraction is treated with 50% NaOH solution. Dimethylaniline hydrochloride is converted to dimethylaniline and excess HCl to NaCl. A 10% excess of NaOH is used in this step. Dimethylaniline saturated with water contains only 0.12% $H_2O$; consequently, the dimethylaniline from a phase separator is suitable for direct recycling. The extracted crude polybutene ethylene diamine is subjected to the usual purification with reduced NaOH flow because neutralization of amine hydrochloride is not required.

EXAMPLE 4

2,435 g. of polyisobutenyl chloride having an average molecular weight of 1,400 was reacted with 728 g. of dimethylamino propylamine for about 3 hours at 150°C. The product containing over 100 g. of excess unreacted amine was then divided into 5 equal portions of about 600 g. each. To each portion was added a less volatile fluid amine as follows: To portions A, B and C was added 12.75 g., 16.0 g. and 12.1 g. of tetraethylene pentamine, respectively; to portions D and E was added 35.6 g. and 44.7 g. of diethanolamine, respectively. Each portion was then reacted with the less volatile amine for 15 minutes at 50° ± 5°C and stripped of volatile amine at temperatures up to 160°C ± 10° at reduced pressure. In each case 98 g. ± 4 g. of distillate were obtained. Gas chromatography showed the distillate was free of the less volatile amine.

It is apparent that many widely different embodiments of this invention may be made without departing from the spirit and scope thereof. While the character of this invention has been described in detail with several illustrations, this has been done by way of exemplification only and without limitation of the invention. It will be apparent to those skilled in the art that numerous modifications and variations of the illustrative examples can be made in the practice of the invention within the scope of the following claims.

I claim:

1. In a process for the preparation of a hydrocarbylamine by contacting a polyolefin containing more than 30 carbon atoms with chlorine in an inert medium at a temperature of from about −40° to about 105°C to form a chlorinated polyolefin and hydrogen chloride, and contacting a volatile primary or secondary amine having a boiling point below about 200°C at atmospheric pressure with said chlorinated polyolefin at a temperature of from about 65° to 200°C to form a mixture comprising hydrocarbylamine, unreacted volatile amine and HCl, the improvement which comprises the more complete separation of said volatile amine from said mixture by contacting said mixture with a fluid amine having a boiling point at least about 5°–40°C greater than the boiling point of said volatile amine at the same pressure prior to stripping said mixture.

2. The process of claim 1 wherein said fluid amine is an alkyl, alkylene, or aryl amine, or a combination thereof.

3. The process of claim 2 wherein said fluid amine is an alkylene polyamine or hydroxyamine.

4. The process of claim 1 wherein said hydrocarbylamine is a polybutenylamine.

5. The process of claim 1 wherein said volatile primary or secondary amine is selected from the class consisting of dimethylamino propylamine and ethylene diamine, and said fluid amine is diethanolamine or tetraethylene pentamine.

* * * * *